United States Patent
Barkan (10) Patent No.: US 7,817,661 B1
(45) Date of Patent: Oct. 19, 2010

(54) DUAL-MEDIA NETWORK INTERFACE THAT AUTOMATICALLY DISABLES INACTIVE MEDIA

(75) Inventor: Ozdal Barkan, Mountain View, CA (US)

(73) Assignee: Marvell International Ltd., Hamilton (BM)

( * ) Notice: Subject to any disclaimer, the term of this patent is extended or adjusted under 35 U.S.C. 154(b) by 1422 days.

(21) Appl. No.: 11/200,659

(22) Filed: Aug. 10, 2005

Related U.S. Application Data (60) Provisional application No. 60/656,661, filed on Feb. 24, 2005.

(51) Int. Cl.
*H04L 12/66* (2006.01)
(52) U.S. Cl. ..................................... 370/463
(58) Field of Classification Search ................. 370/463, 370/360, 395.2; 439/490
See application file for complete search history.

(56) References Cited

U.S. PATENT DOCUMENTS

| | | | | |
|---|---|---|---|---|
| 5,577,069 A * | 11/1996 | Lau et al. | | 375/242 |
| 7,054,309 B1 * | 5/2006 | Hoot et al. | | 370/360 |
| 7,120,721 B1 * | 10/2006 | Tuttle et al. | | 710/305 |
| 7,243,182 B2 * | 7/2007 | Jensen et al. | | 710/317 |
| 7,619,975 B1 * | 11/2009 | Lo | | 370/235 |
| 2003/0179709 A1 * | 9/2003 | Huff | | 370/248 |
| 2003/0179711 A1 * | 9/2003 | Huff | | 370/248 |
| 2004/0081196 A1 * | 4/2004 | Elliott | | 370/465 |
| 2004/0085974 A1 * | 5/2004 | Mies et al. | | 370/406 |
| 2004/0153854 A1 * | 8/2004 | Agrawal et al. | | 714/43 |
| 2004/0161207 A1 * | 8/2004 | Chiu et al. | | 385/88 |
| 2004/0161240 A1 * | 8/2004 | Weber | | 398/139 |
| 2005/0114663 A1 * | 5/2005 | Cornell et al. | | 713/168 |

\* cited by examiner

*Primary Examiner*—Kevin C Harper
*Assistant Examiner*—Sai-Ming Chan

(57) ABSTRACT

A dual-media network interface includes a physical layer device. A first interface module communicates with the physical layer device via a medium dependent interface. A link indicator indicates a communications link with the physical layer device via the first interface module. The physical layer device transmits a link indication signal to the link indicator and a small form-factor pluggable (SFP) interface module when the physical layer device establishes a communications link via the first interface module. The link indication signal activates the link indicator and disables the SFP interface module. The dual-media network interface is a single-port network interface and only one of the first interface module or the SFP interface module is active at a time. The first interface module is a copper media interface module. The SFP interface module is one of a copper media interface module or a fiber optic media interface module.

54 Claims, 3 Drawing Sheets

DUAL-MEDIA NETWORK INTERFACE THAT AUTOMATICALLY DISABLES INACTIVE MEDIA

CROSS-REFERENCE TO RELATED APPLICATIONS

This application claims the benefit of U.S. Provisional Application No. 60/656,661, filed on Feb. 24, 2005, which is hereby incorporated by reference in its entirety.

FIELD OF THE INVENTION

The present invention relates to dual-media network interfaces, and more particularly to dual-media network interfaces that include small form-factor pluggable (SFP) interface modules.

BACKGROUND OF THE INVENTION

Dual-media network interfaces support two separate interfaces for a single port of a network device. For example, a single port of an Ethernet network interface may include a first interface for a copper medium and a second interface for a fiber optic medium. However, both interfaces may also support the same types of media. Dual-media network interfaces allow flexibility by providing a user with an option between two potentially different media. Additionally, dual-media network interfaces allow users to utilize redundant network connections. For example, if a first interface of a dual-media network interface fails, the dual-media network interface may be programmed to automatically switch to a second interface that includes a redundant network connection. Such redundant network connections reduce network downtime.

Some dual-media network interfaces include small form-factor pluggable (SFP) interfaces that support SFP modules. SFP modules are interchangeable plug-in transceivers that are typically hot-swappable and provide interfaces for desired media. For example, SFP modules commonly provide interfaces for high-speed fiber optic media. However, SFP modules provide interfaces for other media such as copper media. SFP modules allow a user to quickly and inexpensively repair or upgrade a network device. For example, if an SFP module fails, the SFP module can be replaced without soldering components. Simultaneous active links for a single port of a dual-media network interface can cause significant network disruption and/or downtime including a total network failure. Therefore, only one interface of a dual-media network interface is active at a time.

Figure 1:
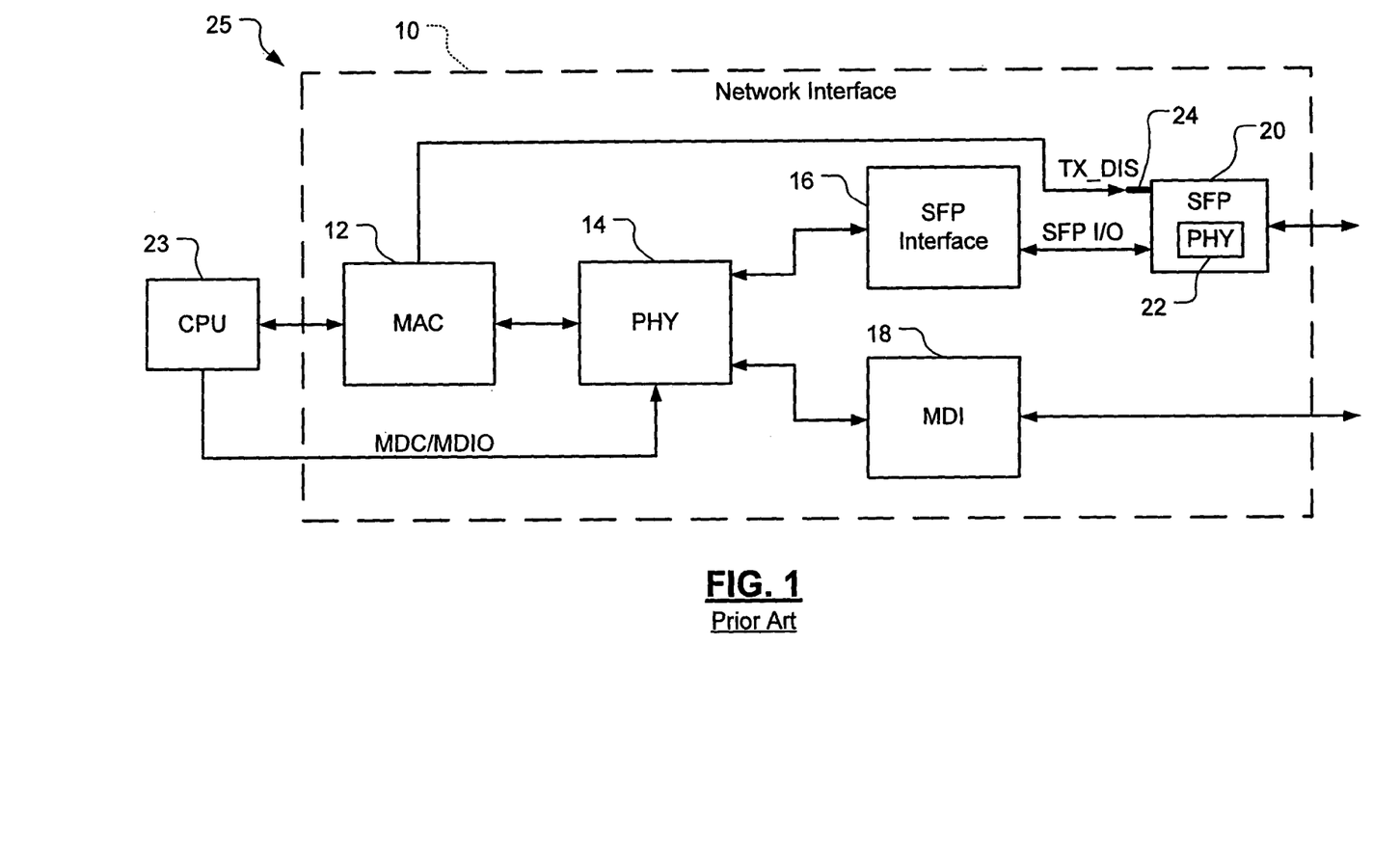
FIG. 1 is a functional block diagram of a dual-media network interface for a network device according to the prior art.

Referring now to FIG. 1, a dual-media network interface 10 includes a medium access control (MAC) device 12 that communicates with a physical layer device 14 (or PHY). The physical layer device 14 communicates with first and second interfaces 16 and 18. The first interface 16 (labeled "A" in FIG. 1) is an SFP interface between the physical layer device 14 and an SFP module 20. The second interface 18 (labeled "B" in FIG. 1) is illustrated as a medium dependent interface (MDI) such as a copper media interface, although the second interface 18 may be another type of interface. For example, the second interface 18 may be hard-wired and controlled by the physical layer device 14. Conversely, the SFP module 20 includes an independent physical layer device 22 that controls network communications between the SFP module 20 and external devices.

As discussed above, it is undesirable for the first and second interfaces 16 and 18, respectively, to simultaneously establish links between the physical layer device 14 and external devices. In one approach, the physical layer device 14 utilizes link monitoring software to determine when either the first or second interface 16 or 18, respectively, establishes a link. For example, a processor 23 may execute the link monitoring software and communicate with the physical layer device 14 via management data input/output and management data clock (MDC/MDIO) signals.

The processor 23 is capable of reading registers in the physical layer device 14 via the MDC/MDIO signals in order to monitor links between the physical layer device 14 and external devices. For example, the link monitoring software may periodically poll the first and second interfaces 16 and 18 to detect when one of the first or second interfaces 16 or 18, respectively, establishes a link. When a link is detected at one of the first or second interfaces 16 or 18, respectively, the link monitoring software ceases communications via the other of the first or second interfaces 18 or 16, respectively. For example, the link monitoring software may cease communications via an interface 16 or 18 by disabling an internal module that is dedicated to the particular interface 16 or 18.

Since the second interface 18 is controlled by the physical layer device 14, the link monitoring software is capable of quickly and completely ceasing communications via the second interface 18 when a link is detected at the first interface 16. However, it is possible for the independent physical layer device 22 to retain a link with an external device even after the link monitoring software ceases communications via the first interface 16. For example, in order to disable the SFP module 20, the processor 23 may first transmit a signal to the MAC device 12, which is then forwarded to a disable pin 24 of the SFP module 20 (identified as TX_DIS in FIG. 1). In this case, an appreciable delay occurs from the time when the processor 23 first detects a link at the second interface 18 to the time when the MAC device 12 disables the SFP module 20 via the disable pin 24.

Additionally, the delay may be further extended when the processor 23 is busy processing other data unrelated to the dual-media network interface 10. For example, a network device 25 that includes the dual-media network interface 10 may include a large number of ports. In this case, the external device may still detect a link with the dual-media network interface 10 and attempt to send packets, which may create a disruptive renegotiation loop or other network congestion when the external device does not detect a response. Also, during the period of time both the first and second interfaces 16 and 18, respectively, are capable of establishing links on the same port, which can cause significant network disruption.

SUMMARY OF THE INVENTION

A dual-media network interface according to the present invention includes a physical layer device. A first interface module communicates with the physical layer device via a medium dependent interface. A small form-factor pluggable (SFP) interface module communicates with the physical layer device. A link indicator indicates a communications link with the physical layer device via the first interface module. The physical layer device transmits a link indication signal to the link indicator and the SFP interface module when the physical layer device establishes a communications link via the first interface module. The link indication signal activates the link indicator and disables the SFP interface module.

In other features, the dual-media network interface is a single-port network interface and only one of the first interface module or the SFP interface module is active at a time.

The first interface module is a copper media interface module. The copper media interface module interfaces with media that is compliant with at least one of 1000BASE-T, 100BASE-TX, and/or 10BASE-T standards. The SFP interface module interfaces with media that is compliant with at least one of 100BASE-FX, 10BASE-T, 100BASE-T, and/or 1000BASE-T standards.

In still other features of the invention, the SFP interface module is one of a copper media interface module or a fiber optic media interface module. The SFP interface module communicates with the physical layer device via at least one of a serial gigabit medium independent interface (SGMII), a 4-byte/5-byte (4B/5B) local fiber interface, and/or a serializer/deserializer (SERDES) interface. The physical layer device includes an SFP control module. The physical layer device disables the SFP control module when the physical layer device establishes a communications link via the first interface module. The physical layer device includes a copper control module. The physical layer device disables the copper control module when the physical layer device establishes a communications link via the SFP interface module. A medium access control (MAC) device communicates with the physical layer device.

In yet other features, the physical layer device includes a link status pin. The physical layer device asserts the link status pin when the physical layer device establishes a communications link via the first interface module. The SFP interface module includes a disable pin that communicates with the link status pin. The SFP interface module is disabled when the physical layer device asserts the link status pin. The link indicator communicates with the link status pin. The link indicator is activated when the physical layer device asserts the link status pin. The link indicator is a light-emitting diode (LED). A network device comprises the dual-media network interface.

A dual-media network interface according to the present invention includes a first copper media interface module. A physical layer device includes a copper link status pin and asserts the copper link status pin when the physical layer device establishes a communications link via the first copper media interface module. A copper link indicator indicates a communications link with the physical layer device via the first copper media interface module and communicates with the copper link status pin. A small form-factor pluggable (SFP) interface module includes an SFP disable pin. The SFP disable pin communicates with the copper link status pin. The copper link indicator is activated and the SFP interface module is disabled when the physical layer device asserts the copper link status pin.

In other features, the dual-media network interface is a single-port network device and only one of the first copper media interface module or the SFP interface module is active at a time. The first copper media interface module interfaces with media that is compliant with at least one of 1000BASE-T, 100BASE-TX, and/or 10BASE-T standards. The SFP interface module interfaces with media that is compliant with at least one of 100BASE-FX, 10BASE-T, 100BASE-T, and/or 1000BASE-T standards. The SFP interface module is one of a second copper media interface module or a fiber optic media interface module. The first copper media interface module communicates with the physical layer device via a medium dependent interface (MDI). The SFP interface module communicates with the physical layer device via at least one of a serial gigabit medium independent interface (SGMII), a 4-byte/5-byte (4B/5B) local fiber interface, and/or a serializer/deserializer (SERDES) interface.

In still other features of the invention, the physical layer device includes an SFP control module. The physical layer device disables the SFP control module when the physical layer device establishes a communications link via the first copper media interface module. The physical layer device includes a copper control module. The physical layer device disables the copper control module when the physical layer device establishes a communications link via the SFP interface module. A medium access control (MAC) device communicates with the physical layer device. The copper link indicator is a light-emitting diode (LED). A network device comprises the dual-media network interface.

A method for operating a dual-media network interface according to the present invention includes providing a first interface module that communicates with a physical layer device via a medium dependent interface. A small form-factor pluggable (SFP) interface module is provided that communicates with the physical layer device. A communications link is established via the first interface module. A link indication signal is transmitted to a link indicator and the SFP interface module. The link indication signal activates the link indicator and disables the SFP interface module.

In other features, the dual-media network interface is a single-port network interface and only one of the first interface module or the SFP interface module is active at a time. The first interface module is a copper media interface module. The copper media interface module interfaces with media that is compliant with at least one of 1000BASE-T, 100BASE-TX, and/or 10BASE-T standards. The SFP interface module interfaces with media that is compliant with at least one of 100BASE-FX, 10BASE-T, 100BASE-T, and/or 1000BASE-T standards.

In still other features of the invention, the SFP interface module is one of a copper media interface module or a fiber optic media interface module. The SFP interface module communicates with the physical layer device via at least one of a serial gigabit medium independent interface (SGMII), a 4-byte/5-byte (4B/5B) local fiber interface, and/or a serializer/deserializer (SERDES) interface. A communications link is established via the first interface module. An SFP control module in the physical layer device is disabled. A communications link is established via the SFP interface module. A copper control module in the physical layer device is disabled. A medium access control (MAC) device communicates with the physical layer device.

In yet other features, a communications link is established via the first interface module. A link status pin is asserted. The SFP interface module is disabled during the asserting step. The SFP interface module includes a disable pin that communicates with the link status pin. The link indicator is activated during the asserting step. The link indicator communicates with the link status pin. The link indicator is a light-emitting diode (LED). The dual-media network interface is integrated into a network device.

A method for operating a dual-media network interface according to the present invention includes providing a first copper media interface module that communicates with a physical layer device. A communications link is established via the first copper media interface module. A copper link status pin is asserted. A small form-factor pluggable (SFP) interface module is provided that includes an SFP disable pin. A copper link indicator is activated and the SFP interface module is disabled during the asserting step. The SFP disable pin and the copper link indicator communicate with the copper link status pin.

In other features, the dual-media network interface is a single-port network device and only one of the first copper media interface module or the SFP interface module is active at a time. The first copper media interface module interfaces with media that is compliant with at least one of 1000BASE-T, 100BASE-TX, and/or 10BASE-T standards. The SFP interface module interfaces with media that is compliant with at least one of 100BASE-FX, 10BASE-T, 100BASE-T, and/or 1000BASE-T standards. The SFP interface module is one of a second copper media interface module or a fiber optic media interface module. The first copper media interface module communicates with the physical layer device via a medium dependent interface (MDI). The SFP interface module communicates with the physical layer device via at least one of a serial gigabit medium independent interface (SGMII), a 4-byte/5-byte (4B/5B) local fiber interface, and/or a serializer/deserializer (SERDES) interface.

In still other features of the invention, a communications link is established via the first copper media interface module. An SFP control module in the physical layer device is disabled. A communications link is established via the SFP interface module. A copper control module in the physical layer device is disabled. A medium access control (MAC) device communicates with the physical layer device. The copper link indicator is a light-emitting diode (LED). The dual-media network interface is integrated into a network device.

A dual-media network interface according to the present invention includes communications configuring means for specifying a data communications configuration. First interfacing means communicates with the communications configuring means via a medium dependent interface. Pluggable interfacing means communicates with the communications configuring means. Link indicating means indicates a communications link with the communications configuring means via the first interfacing means. The communications configuring means transmits a link indication signal to the link indicating means and the pluggable interfacing means when the communications configuring means establishes a communications link via the first interfacing means. The link indication signal activates the link indicating means and disables the pluggable interfacing means.

In other features, the dual-media network interface is a single-port network interface and only one of the first interfacing means or the pluggable interfacing means is active at a time. The first interfacing means is a copper media interface module. The copper media interface module interfaces with media that is compliant with at least one of 1000BASE-T, 100BASE-TX, and/or 10BASE-T standards. The pluggable interfacing means interfaces with media that is compliant with at least one of 100BASE-FX, 10BASE-T, 100BASE-T, and/or 1000BASE-T standards.

In still other features of the invention, the pluggable interfacing means is one of a copper media interface module or a fiber optic media interface module. The pluggable interfacing means communicates with the communications configuring means via at least one of a serial gigabit medium independent interface (SGMII), a 4-byte/5-byte (4B/5B) local fiber interface, and/or a serializer/deserializer (SERDES) interface. The communications configuring means includes pluggable controlling means for configuring the pluggable interfacing means. The communications configuring means disables the pluggable controlling means when the communications configuring means establishes a communications link via the first interfacing means. The communications configuring means includes interface controlling means for configuring the first interfacing means. The communications configuring means disables the interface controlling means when the communications configuring means establishes a communications link via the pluggable interfacing means. Medium controlling means for controlling use of a medium communicates with the communications configuring means.

In yet other features, the communications configuring means includes link communicating means for communicating link status. The communications configuring means asserts the link communicating means when the communications configuring means establishes a communications link via the first interfacing means. The pluggable interfacing means includes disabling means for disabling the pluggable interfacing means that communicates with the link communicating means. The pluggable interfacing means is disabled when the communications configuring means asserts the link communicating means. The link indicating means communicates with the link communicating means. The link indicating means is activated when the communications configuring means asserts the link communicating means. The link indicating means is a light-emitting diode (LED). A network device comprises the dual-media network interface.

A dual-media network interface according to the present invention includes first copper interfacing means for interfacing with copper media. Communications configuring means for specifying a data communications configuration includes link communicating means for communicating link status and asserts the link communicating means when the communications configuring means establishes a communications link via the first copper interfacing means. Link indicating means for indicating a communications link with the communications configuring means via the first copper interfacing means communicates with the link communicating means. Pluggable interfacing means for communicating with the communications configuring means includes disabling means for disabling the pluggable interfacing means. The disabling means communicates with the link communicating means. The link indicating means is activated and the pluggable interfacing means is disabled when the communications configuring means asserts the link communicating means.

In other features, the dual-media network interface is a single-port network device and only one of the first copper interfacing means or the pluggable interfacing means is active at a time. The first copper interfacing means interfaces with media that is compliant with at least one of 1000BASE-T, 100BASE-TX, and/or 10BASE-T standards. The pluggable interfacing means interfaces with media that is compliant with at least one of 100BASE-FX, 10BASE-T, 100BASE-T, and/or 1000BASE-T standards. The pluggable interfacing means is one of second copper interfacing means or fiber optic interfacing means for interfacing with fiber optic media. The first copper interfacing means communicates with the communications configuring means via a medium dependent interface (MDI). The pluggable interfacing means communicates with the communications configuring means via at least one of a serial gigabit medium independent interface (SGMII), a 4-byte/5-byte (4B/5B) local fiber interface, and/or a serializer/deserializer (SERDES) interface.

In still other features of the invention, the communications configuring means includes pluggable controlling means for configuring the pluggable interfacing means. The communications configuring means disables the pluggable controlling means when the communications configuring means establishes a communications link via the first copper interfacing means. The communications configuring means includes interface controlling means for configuring the first copper interfacing means. The communications configuring means disables the interface controlling means when the communications configuring means establishes a communications link via the pluggable interfacing means. Medium controlling means for controlling use of a medium communicates with the communications configuring means. The link indicating means is a light-emitting diode (LED). A network device comprises the dual-media network interface.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses. For purposes of clarity, the same reference numbers will be used in the drawings to identify similar elements. As used herein, the term module and/or device refers to an application specific integrated circuit (ASIC), an electronic circuit, a processor (shared, dedicated, or group) and memory that execute one or more software or firmware programs, a combinational logic circuit, and/or other suitable components that provide the described functionality.

A dual-media network interface according to the present invention automatically disables interfaces associated with inactive media when a link is established at another interface. The dual-media network interface prevents independent physical layer devices associated with small form-factor pluggable (SFP) modules from establishing or maintaining links with external devices after another interface previously establishes a link.

Figure 2:
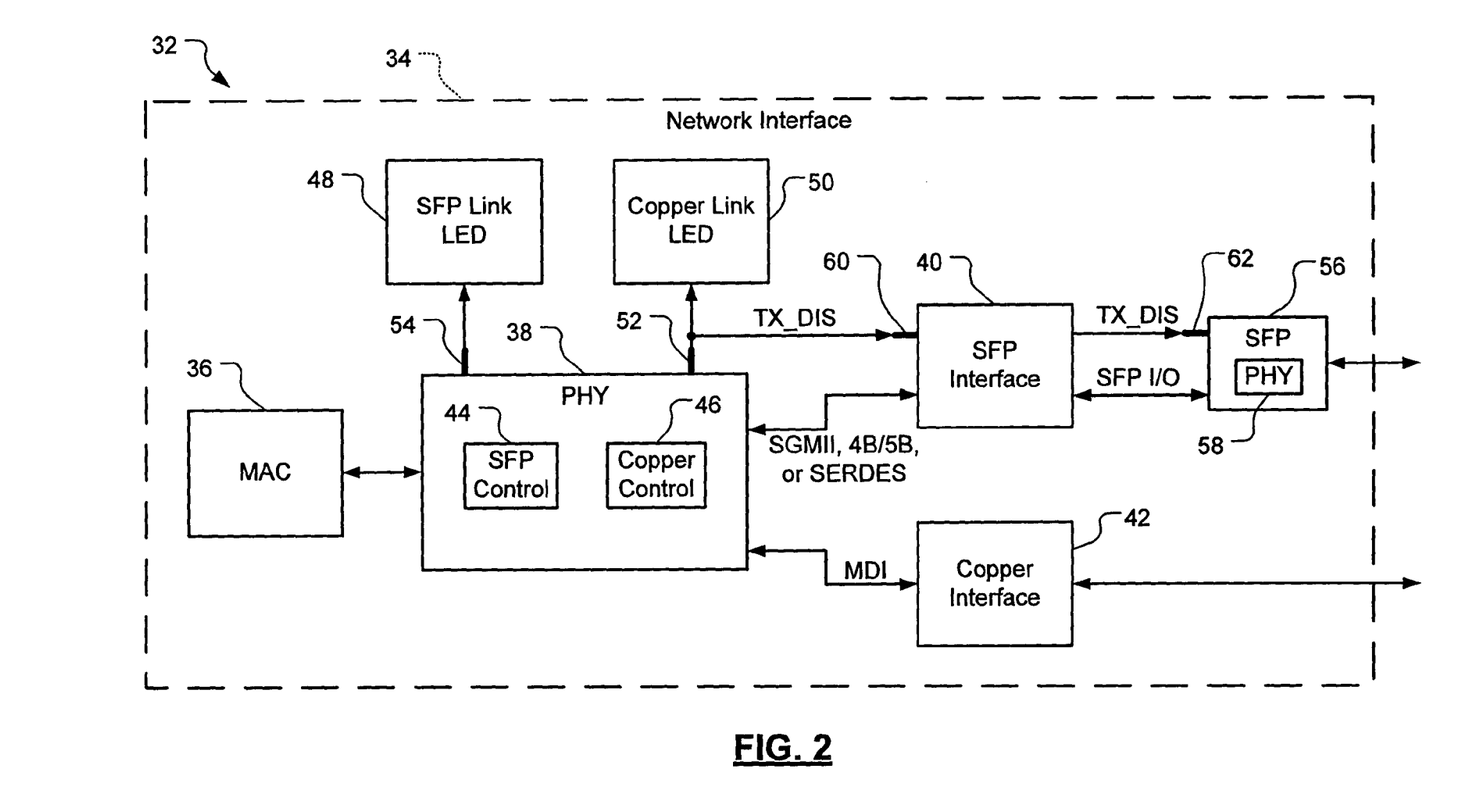
FIG. 2 is a functional block diagram of a dual-media network interface including a physical layer device that automatically disables inactive media according to the present invention.

Referring now to FIG. 2, an exemplary network device 32 includes a dual-media network interface 34 having a medium access control (MAC) device 36 that communicates with a physical layer device 38 (or PHY). The dual-media network interface 34 includes an SFP interface 40 and a copper interface 42. The SFP interface 40 communicates with the physical layer device 38 through a serial gigabit medium independent interface (SGMII) or another interface such as a 4-byte/5-byte (4B/5B) local fiber interface or a serializer/deserializer (SERDES) interface. In an exemplary embodiment, the SFP interface 40 supports SFP modules that interface with fiber media according to 100BASE-FX standards. Alternatively or additionally, the SFP interface 40 supports SFP modules that interface with copper media according to 10BASE-T, 100BASE-T, and/or 1000BASE-T standards and/or other current or future Ethernet standards.

The copper interface 42 communicates with the physical layer device 38 through a medium dependent interface. For example, the copper interface 42 may be hard-wired and solely controlled by the physical layer device 38. Additionally, the copper interface 42 may include an RJ-45 connector with or without integrated magnetics (MAG). In an exemplary embodiment, the copper interface 42 interfaces with copper media according to 10BASE-T, 100BASE-TX, and/or 1000BASE-T standards.

The physical layer device 38 includes an SFP control module 44 that is associated with the SFP interface 40 and a copper control module 46 that is associated with the copper interface 42. The physical layer device 38 ceases communications via the SFP interface 40 and/or the copper interface 42 by disabling the SFP control module 44 and/or the copper control module 46, respectively. For example, the physical layer device 38 may utilize link monitoring software that detects established links at the SFP and copper interfaces 40 and 42, respectively. The dual-media network interface 34 includes an SFP link indicator 48 and a copper link indicator 50. For example, the SFP and copper link indicators 48 and 50, respectively, may be light-emitting diodes (LEDs) or other types of indicators 48 and 50 that indicate the presence of an established link to a user. The physical layer device 38 activates the copper link indicator 50 when a link is established at the copper interface 42. Likewise, the physical layer device 38 activates the SFP link indicator 48 when a link is established at the SFP interface 40.

According to an exemplary embodiment, the physical layer device 38 includes a copper link indication pin 52 and an SFP link indication pin 54. The physical layer device 38 asserts the copper link indication pin 52 and disables the SFP control module 44 when a link is established at the copper interface 42. Likewise, the physical layer device 38 asserts the SFP link indication pin 54 and disables the copper control module 46 when a link is established at the SFP interface 40. For example, disabling the copper control module 46 disables the copper interface 42. The physical layer device 38 may assert the copper link indication pin 52 and SFP link indication pin 54 by outputting a logical high signal, a logical low signal, or another signal at a specific voltage or within a specific voltage range.

The SFP interface 40 supports an SFP module 56 including an independent physical layer device 58. Therefore, disabling the SFP control module 44 alone does not necessarily prevent the SFP module 56 from establishing a link with an external device. Communications standards typically require that SFP interfaces 40 include a disable pin 60. The SFP interface 40 and the SFP module 56 are disabled when the disable pin 60 is asserted. For example, the SFP module 56 may include a disable pin 62 that communicates with the disable pin 60 of the SFP interface 40. According to the present invention, the disable pin 60 of the SFP interface 40 communicates with the copper link indication pin 52. Therefore, when the physical layer device 38 asserts the copper link indication pin 52, the SFP interface 40 and the SFP module 56 are automatically and immediately disabled.

Since the copper interface 42 is solely controlled by the copper control module 46, the copper interface 42 is automatically disabled when the physical layer device 38 disables the copper control module 46. Additionally, the SFP interface 40 and SFP module 56 are automatically disabled when a link is established at the copper interface 42. Therefore, the present invention avoids problems associated with double linking that can occur when a processor performs link monitoring. For example, in prior art systems, software delays in processors prevent the physical layer device 38 from immediately disabling the SFP module 56 when a link is established at the copper interface 42.

According to the present invention, double linking is avoided in this case because the physical layer device 38 does not wait for the link monitoring software to first detect the link at the copper interface 42 and then take action. Instead, the SFP interface 40 and SFP module 56 are disabled as soon as the physical layer device 38 detects the link at the copper interface 42 and activates the copper link indicator 50. Therefore, the SFP interface 40 and the SFP module 56 will already be disabled by the time the link monitoring software detects the link at the copper interface 42. Therefore, there is no longer an overlap in time where the SFP and copper interfaces 40 and 42, respectively, are capable of simultaneously establishing links. Additionally, the independent physical layer device 58 in the SFP module 56 is unable to retain a link with an external device after a link is established at the copper interface 42.

SFP modules 56 that interface with fiber media will typically shut down automatically and refrain from establishing links with external devices when the physical layer device 38 disables the SFP control module 44. However, the SFP module 56 may still establish a link with an external device when unintentional signal conditions such as noise occur. Therefore, unintentional links with external devices are avoided by completely disabling both the SFP interface 40 and the SFP module 56 when a link occurs at the copper interface 42.

Figure 3:
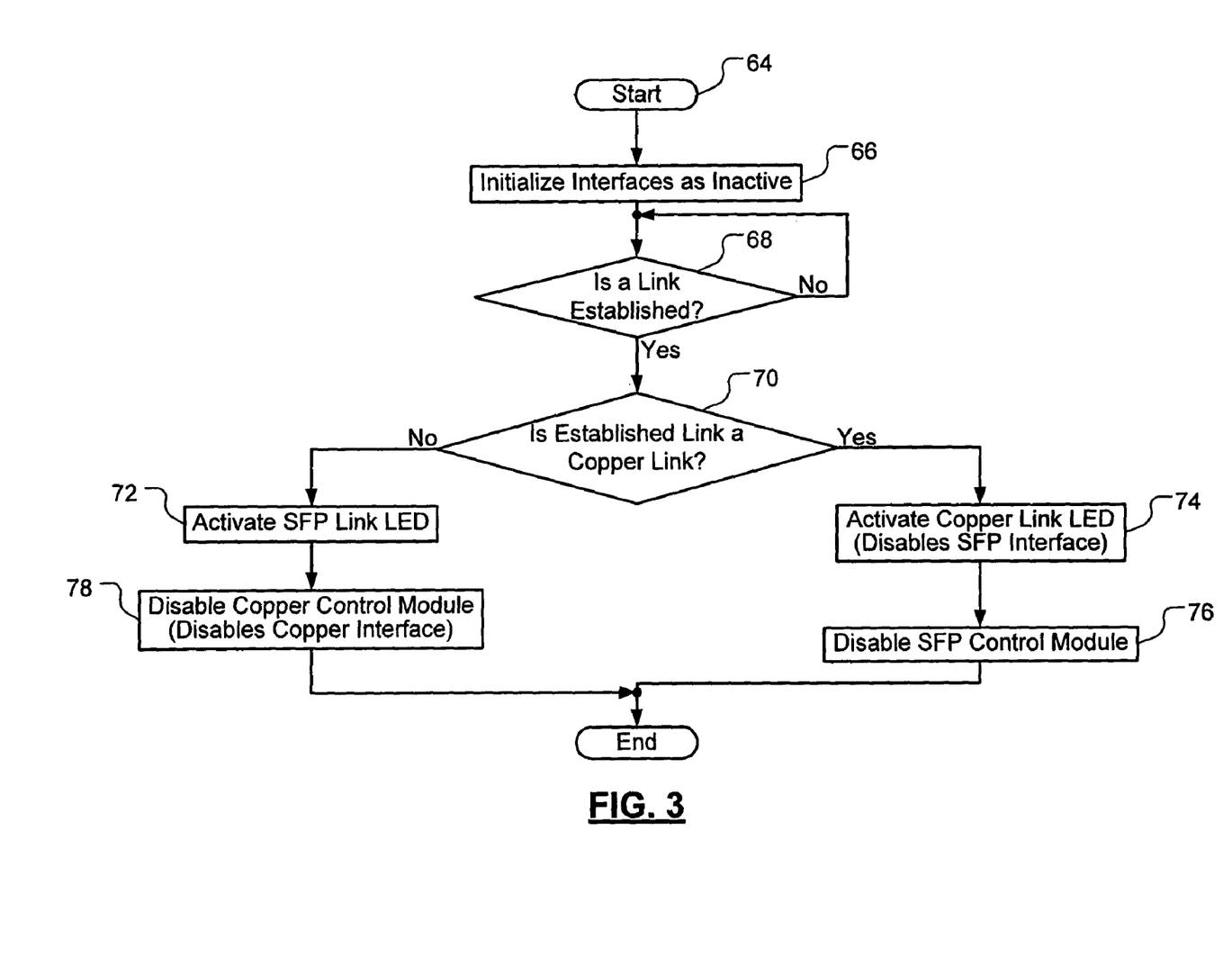
FIG. 3 is a flowchart illustrating steps performed by the physical layer device of FIG. 2 when a link is detected at a media interface.

Referring now to FIG. 3, a link detection algorithm begins in step 64. In step 66, the physical layer device 38 initializes the SFP interface 40 and the copper interface 42 as inactive. In step 68, control determines whether a link has been established at either the SFP interface 40 or the copper interface 42. If false, control loops to step 68. If true, control proceeds to step 70. In step 70, control determines whether the link was established at the copper interface 42. If false, control proceeds to step 72. If true, the physical layer device 38 activates the copper link indicator 50 in step 74.

Since the disable pin 60 is tied to the copper link indication pin 52, the physical layer device 38 also disables the SFP interface 40 by activating the copper link indicator 50. In step 76, the physical layer device 38 disables the SFP control module 44 and control ends. In step 72, the physical layer device 38 activates the SFP link indicator 48. In step 78, the physical layer device 38 disables the copper control module 46 and control ends. Since the copper interface 42 is completely controlled by the physical layer device 38, the copper interface 42 is also disabled in step 78.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and the following claims.

What is claimed is:

1. A dual-media network interface, comprising:
   a physical layer device;
   a first interface module that communicates with the physical layer device via a medium dependent interface;
   a small form-factor pluggable (SFP) interface module that communicates with the physical layer device; and
   a link indicator that indicates a communications link with the physical layer device via the first interface module,
   wherein the physical layer device transmits a link indication signal to the link indicator and the SFP interface module responsive to the physical layer device establishing a communications link over copper via the first interface module, and
   wherein the link indication signal activates the link indicator and disables the SFP interface module.

2. The dual-media network interface of claim 1, wherein the dual-media network interface is a single-port network interface, and only one of the first interface module or the SFP interface module is active at a time.

3. The dual-media network interface of claim 1, wherein the first interface module is a copper media module.

4. The dual-media network interface of claim 3, wherein the copper media module interfaces with media that is compliant with at least one of 1000BASE-T, 100BASE-TX, or 10BASE-T standards.

5. The dual-media network interface of claim 1, wherein the SFP interface module interfaces with media that is compliant with at least one of 100BASE-FX, 10BASE-T, 100BASE-T, or 1000BASE-T standards.

6. The dual-media network interface of claim 1, wherein the SFP interface module is a copper media interface module or a fiber optic media interface module.

7. The dual-media network interface of claim 1, wherein the SFP interface module communicates with the physical layer device via at least one of a serial gigabit medium independent interface (SGMII), a 4-byte/5-byte (4B/5B) local fiber interface, or a serializer/deserializer (SERDES) interface.

8. The dual-media network interface of claim 1, wherein the physical layer device includes an SFP control module, and wherein the physical layer device disables the SFP control module responsive to the physical layer device establishing a communications link via the first interface module.

9. The dual-media network interface of claim 3, wherein the physical layer device includes a copper control module, and wherein the physical layer device disables the copper module responsive to the physical layer device establishing a communications link via the SFP interface module.

10. The dual-media network interface of claim 1, further comprising a medium access control (MAC) device that communicates with the physical layer device.

11. The dual-media network interface of claim 1, wherein the physical layer device includes a link status pin, and wherein the physical layer device asserts the link status pin responsive to the physical layer device establishing a communications link via the first interface module.

12. The dual-media network interface of claim 11, wherein the SFP interface module includes a disable pin that communicates with the link status pin, and wherein the SFP interface module is disabled responsive to the physical layer device asserting the link status pin.

13. The dual-media network interface of claim 11, wherein the link indicator directly communicates with the link status pin, and wherein the link indicator is activated responsive to the physical layer device asserting the link status pin.

14. The dual-media network interface of claim 13, wherein the link indicator is a light-emitting diode (LED).

15. A network device comprising: the dual-media network interface of claim 1.

16. A dual-media network interface, comprising:
   a first copper media interface module;
   a physical layer device that (i) includes a copper link status pin and (ii) asserts the copper link status pin responsive to the physical layer device establishing a communications link over copper via the first copper media interface module;
   a copper link indicator that (i) indicates the communications link with the physical layer device via the first copper media interface module and (ii) communicates with the copper link status pin; and a small form-factor pluggable (SFP) interface module that includes an SFP disable pin, wherein the SFP disable pin communicates with the copper link status pin, and wherein the copper link indicator is activated and the SFP interface module is disabled responsive to the physical layer device asserting the copper link status pin.

17. The dual-media network interface of claim 16, wherein the dual-media network interface is a single-port network device, and only one of the first copper media interface module or the SFP interface module is active at a time.

18. The dual-media network interface of claim 16, wherein the first copper media interface module interfaces with media that is compliant with at least one of 1000BASE-T, 100BASE-TX, or 10BASE-T standards.

19. The dual-media network interface of claim 16, wherein the SFP interface module interfaces with media that is compliant with at least one of 100BASE-FX, 10BASE-T, 100BASE-T, or 1000BASE-T standards.

20. The dual-media network interface of claim 16, wherein the SFP interface module is a second copper media interface module or a fiber optic media interface module.

21. The dual-media network interface of claim 16, wherein the first copper media interface module communicates with the physical layer device via a medium dependent interface (MDI).

22. The dual-media network interface of claim 16, wherein the SFP interface module communicates with the physical layer device via at least one of a serial gigabit medium independent interface (SGMII), a 4-byte/5-byte (4B/5B) local fiber interface, or a serializer/deserializer (SERDES) interface.

23. The dual-media network interface of claim 16, wherein the physical layer device includes an SFP control module, and wherein the physical layer device disables the SFP control module responsive to the physical layer device establishing a communications link via the first copper media interface module.

24. The dual-media network interface of claim 16, wherein the physical layer device includes a copper control module, and wherein the physical layer device disables the copper control module responsive to the physical layer device establishing a communications link via the SFP interface module.

25. The dual-media network interface of claim 16, further comprising a medium access control (MAC) device that communicates with the physical layer device.

26. The dual-media network interface of claim 16, wherein the copper link indicator is a light-emitting diode (LED).

27. A network device comprising: the dual-media network interface of claim 16.

28. A method for operating a dual-media network interface, comprising:

providing a first interface module that communicates with a physical layer device via a medium dependent interface;

providing a small form-factor pluggable (SFP) interface module that communicates with the physical layer device;

establishing a communications link over copper via the first interface module; and transmitting a link indication signal to a link indicator and the SFP interface module, wherein the link indication signal activates the link indicator and disables the SFP interface module.

29. The method of claim 28, wherein the dual-media network interface is a single-port network interface, and only one of the first interface module or the SFP interface module is active at a time.

30. The method of claim 28, wherein the first interface module is a copper media interface module.

31. The method of claim 30, wherein the copper media interface module interfaces with media that is compliant with at least one of 1000BASE-T, 100BASE-TX, or 10BASE-T standards.

32. The method of claim 28, wherein the SFP interface module interfaces with media that is compliant with at least one of 100BASE-FX, 10BASE-T, 100BASE-T, or 1000BASE-T standards.

33. The method of claim 28, wherein the SFP interface module is a copper media interface module or a fiber optic media interface module.

34. The method of claim 28, wherein the SFP interface module communicates with the physical layer device via at least one of a serial gigabit medium independent interface (SGMII), a 4-byte/5-byte (4B/5B) local fiber interface, or a serializer/deserializer (SERDES) interface.

35. The method of claim 28, further comprising:
establishing a communications link via the first interface module; and
disabling an SFP control module in the physical layer device.

36. The method of claim 30 further comprising:
establishing a communications link via the SFP interface module; and
disabling a copper control module in the physical layer device.

37. The method of claim 28, wherein a medium access control (MAC) device communicates with the physical layer device.

38. The method of claim 28, further comprising:
establishing a communications link via the first interface module; and
asserting a link status pin.

39. The method of claim 38, further comprising:
disabling the SFP interface module during the asserting step,
wherein the SFP interface module includes a disable pin that communicates with the link status pin.

40. The method of claim 38, further comprising:
activating the link indicator during the asserting step,
wherein the link indicator communicates with the link status pin.

41. The method of claim 40, wherein the link indicator is a light-emitting diode (LED).

42. The method of claim 28, further comprising integrating the dual-media network interface into a network device.

43. A method for operating a dual-media network interface, the method comprising:

providing a first copper media interface module that communicates with a physical layer device;

establishing a communications link over copper via the first copper media interface module;

asserting a copper link status pin;

providing a small form-factor pluggable (SFP) interface module that includes an SFP disable pin; and activating a copper link indicator and disabling the SFP interface module during the asserting step, wherein the SFP disable pin and the copper link indicator communicate with the copper link status pin.

44. The method of claim 43, wherein the dual-media network interface is a single-port network device, and only one of the first copper media interface module or the SFP interface module is active at a time.

45. The method of claim 43, wherein the first copper media interface module interfaces with media that is compliant with at least one of 1000BASE-T, 100BASE-TX, or 10BASE-T standards.

46. The method of claim 43, wherein the SFP interface module interfaces with media that is compliant with at least one of 100BASE-FX, 10BASE-T, 100BASE-T, or 1000BASE-T standards.

47. The method of claim 43, wherein the SFP interface module is a second copper media interface module or a fiber optic media interface module.

48. The method of claim 43, wherein the first copper media interface module communicates with the physical layer device via a medium dependent interface (MDI).

49. The method of claim 43, wherein the SFP interface module communicates with the physical layer device via at least one of a serial gigabit medium independent interface (SGMII), a 4-byte/5-byte (4B/5B) local fiber interface, or a serializer/deserializer (SERDES) interface.

50. The method of claim 43, further comprising:
establishing a communications link via the first copper media interface module; and
disabling an SFP control module in the physical layer device.

51. The method of claim 43, further comprising:
establishing a communications link via the SFP interface module; and
disabling a copper control module in the physical layer device.

52. The method of claim 43, wherein a medium access control (MAC) device communicates with the physical layer device.

53. The method of claim 43, wherein the copper link indicator is a light-emitting diode (LED).

54. The method of claim 43, further comprising integrating the dual-media network interface into a network device.

* * * * *